United States Patent [19]

Braun et al.

[11] Patent Number: 5,162,715
[45] Date of Patent: Nov. 10, 1992

[54] METHOD AND APPARATUS FOR ABSOLUTE POSITION MEASUREMENT

[76] Inventors: Michael D. Braun, 228 Windtree Rd., Greenwood, S.C. 29649; Michael A. Steinmetz, 104 Kensington Dr., Greenwood, S.C. 29648; Harold D. Wiebe, 11990 Chardon La., Springdale, Ohio 45246

[21] Appl. No.: 732,935

[22] Filed: Jul. 19, 1991

Related U.S. Application Data

[63] Continuation of Ser. No. 479,123, Feb. 13, 1990, abandoned.

[51] Int. Cl.$^5$ .............................................. G01B 7/00
[52] U.S. Cl. .................................................. 318/605
[58] Field of Search ............... 318/574, 575, 590, 592, 318/594, 595, 600, 601, 602, 605, 625, 628, 661; 324/207.14; 901/14, 15, 46, 47, 50

[56] References Cited

U.S. PATENT DOCUMENTS

| | | | |
|---|---|---|---|
| 3,766,460 | 10/1973 | Hentz et al. | 318/628 |
| 4,253,051 | 2/1981 | Schneider | 318/632 |
| 4,481,569 | 11/1984 | Hoodbhoy | 318/601 X |
| 4,567,464 | 1/1986 | Siegel et al. | 340/347 DD |
| 4,580,209 | 4/1986 | Hohn et al. | 364/182 |
| 4,646,827 | 3/1987 | Toyoda et al. | 318/592 |
| 4,713,594 | 12/1987 | Bose et al. | 318/685 |
| 4,783,998 | 11/1988 | Sander | 73/660 |
| 4,809,188 | 2/1989 | Willits et al. | 318/640 X |
| 4,833,382 | 5/1989 | Gibbs | 318/640 |
| 4,941,826 | 7/1990 | Loran et al. | 433/51 |
| 4,972,090 | 11/1990 | Eaton | 250/560 |
| 5,012,169 | 4/1991 | Ono et al. | 318/586 |

Primary Examiner—Bentsu Ro

[57] ABSTRACT

A method and apparatus are provided for measurement of absolute position of a moveable machine member wherein output signals of a plurality of position measuring devices are selectively connected to an interface circuit. Each position measuring device produces output signals representing relative position of a device armature and device stator. The position measuring devices are coupled to the machine member so that the absolute position of the machine member anywhere within its range of motion may be uniquely determined from the output signals. A control signal is produce to control the selection of the output signals to be connected to the interface circuit which, at any instant, receives the output signals of a single position measuring device.

9 Claims, 2 Drawing Sheets

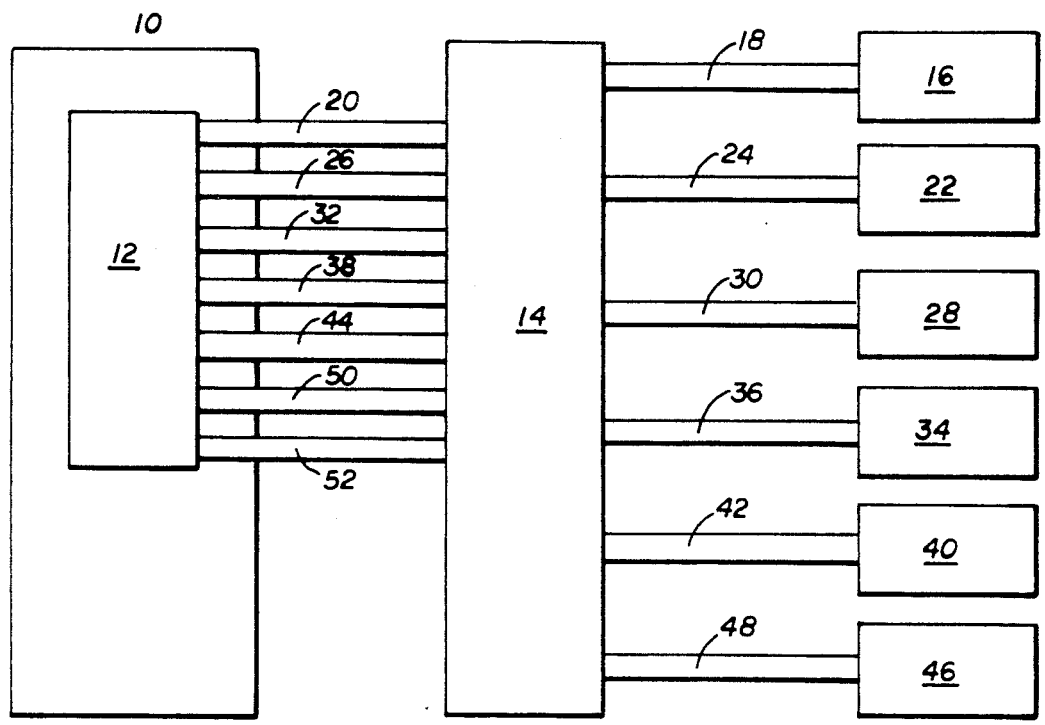

METHOD AND APPARATUS FOR ABSOLUTE POSITION MEASUREMENT

This is a continuation of copending application Ser. No. 07/479,123, filed on Feb. 13, 1990, now abandoned.

BACKGROUND OF THE INVENTION

1. Field of the Invention

This invention relates generally to measuring systems for measuring position of movable machine members. In particular, this invention relates to interconnection between position measuring devices and an interface circuit.

2. Description of the Prior Art

It is known to use two position measuring devices to measure absolute position of a movable machine member. For example, by providing slightly different reductions in the drive to the rotors of two angular position measuring devices, a difference between the position measured by each device is generated which will assume a unique value throughout the range of motion of the machine member. This difference provides a value which may be conveniently used to determine the absolute position of the machine member, even though neither measuring device is suitable for independently indicating the machine member absolute position throughout the full range of motion.

Further, it is known to use resolvers as the position measuring devices in absolute position measuring systems employing angular position measuring devices. Each resolver provides inductive coupling of input signals between rotor and stator elements such that the phase of resolver output signals relative to the input signals is a function of the rotor mechanical location relative to the stator. By driving the rotors of two resolvers differentially relative to one another, the angular position of each rotor detected by a conventional interface will provide the desired difference for determining absolute position. Techniques for use of revolvers in this fashion are described in U.S. Pat. No. 4,580,209.

It will be appreciated that the use of two angular position measuring devices has the inherent disadvantage of increasing the number of conductors required between an interface circuit and the machine where the measuring devices are mounted.

SUMMARY OF THE INVENTION

It is an object of this invention to provide an absolute position measuring system for a movable machine member using two position measuring devices and means for selectively connecting the output signals of each measuring device to an interface circuit.

It is a further object of this invention to provide an absolute position measuring device for each of a plurality of movable machine members, each measuring system using two position measuring devices, and means for selectively connecting the output signals of each measuring device to an interface circuit.

Further objects and advantages of the present invention shall become apparent from the accompanying drawings and the description thereof.

BRIEF DESCRIPTION OF THE DRAWINGS

FIG. 1 is a block diagram in accordance with the present invention as applied to a machine having six axes of motion.

FIG. 2 is a wiring diagram of a pair of resolvers associated with a single machine axis of motion.

DETAILED DESCRIPTION OF THE PREFERRED EMBODIMENT

Figure 3:
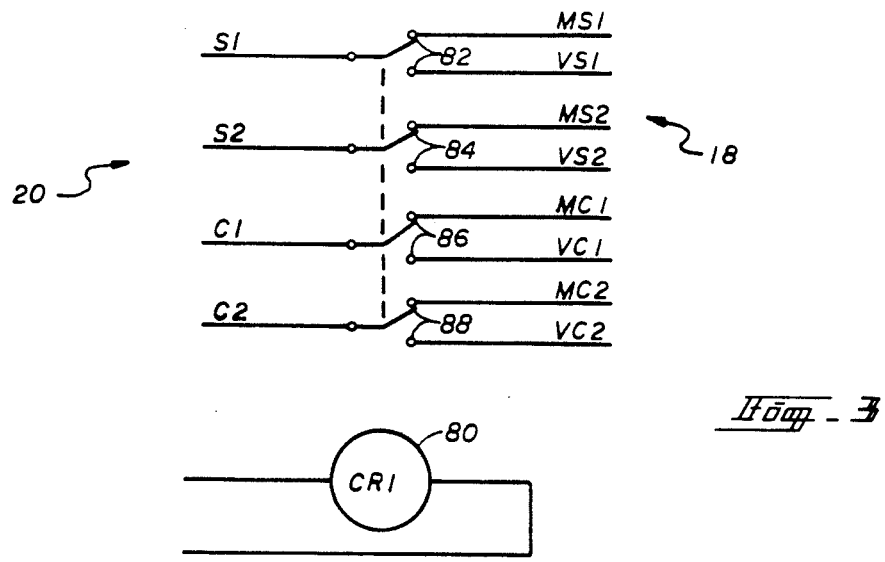
FIG. 3 is a partial circuit diagram of a selector circuit as may be used in the application of FIG. 1.

The invention shall be described with reference to a preferred embodiment as practiced by Cincinnati Milacron Inc., the assignee of the present invention. The preferred embodiment illustrates the invention as applied to an industrial robot available from the assignee.

Referring to FIG. 1, a machine control 10 includes an interface circuit 12 which provides an electrical interface for the measuring devices of position measurement subsystems 16, 22, 28, 34, 40, and 46. Each of these position measurement subsystems is associated with a movable machine member of one of the six axes of motion of an industrial robot. Each absolute position measurement subsystem includes two angular position measuring devices, such as, for example, resolvers. The input and output signals for these angular position measuring devices are connected to the selector 14. Selector 14 selectively connects the output signals of each angular position measuring device of a measurement subsystem to the interface circuitry associated with the machine axis of motion through conductors in cables between the measurement subsystem and the selector 14 and between the selector 14 and the interface circuit 12. For example, with reference to measurement subsystem 16, cable 18 includes conductors for the output signals of both angular position measuring devices while cable 20 provides conductors for output signals for a single angular position measuring device. Likewise, selector 14 selectively connects output signals in cable 24 to the interface circuit 12 via cable 26, and so forth with each of the pairs of cables 30 and 32, 36 and 38, 42 and 44, and 48 and 50. The cable 52 provides conductors for the control signals for the selector 14.

FIG. 2 illustrates the electrical schematic associated with resolvers 60 and 62 of the absolute position measuring subsystem 16. Rotor winding 64 of resolver 60 has a sinusoidal signal impressed on it via conductor pair MR1 and MR2. The rotor sinusoidal signal is inductively coupled to stator windings 74 and 76 which are arranged at poles spaced 90 degrees, one from the other. An output sinusoid appears at conductor pair MS1 and MS2 from stator 74 and an output sinusoid appears at conductor pair MC1 and MC2 from stator winding 76. In a like manner, an input sinusoidal signal is applied to resolver 62 via conductor pair VR1 and VR2. Output sinusoids from the stators of resolver 62 are available at the conductor pairs VS1, VS2 and VC1, VC2.

Continuing with reference to FIG. 2., rotor 64 of resolver 60 and rotor 66 of resolver 62 are mechanically coupled to a drive 68 through a transmission 70 or otherwise. The mechanical coupling between the resolver 60 and the drive 68 is chosen so that the angular position represented by the output signals of resolver 60 corresponds to the rotor angular position of drive 68. The coupling to resolver 62 is chosen to produce a difference between the angular position represented by the output signals of the resolver 62 and the angular position represented by the output signals of the resolver 60. In applicants' preferred embodiment, this difference is equal to one rotation of the rotor 66 over the full range of motion of the associated machine member. In this arrangement, the resolver 60 is designated as the master resolver and the resolver 62 is designated as the vernier resolver. Over the full range of motion of the machine movable member effected by the drive 68, the value of the difference is unique at every position of the machine member. In contrast to the difference, the angular position represented by the output signals of either the master resolver 60 or the vernier resolver 62, are not unique over the full range of motion of the movable machine member. Nevertheless, the absolute position of the machine member may be determined by use of the difference and the apparent angular position of other the master resolver or the vernier resolver. It will be appreciated by those skilled in the art that other arrangements of position measuring devices may be used provided that the position of the machine member anywhere within its range of motion may be uniquely determined from the output signals of the position measuring devices.

While the absolute position of the machine member may be known at any time from the output signals of the master resolver and vernier resolver, it is only necessary to measure the absolute position initially and thereafter to continuously monitor the change of position as represented by a single resolver. Therefore, it is not necessary to monitor the output of both master resolver and vernier resolver except to initially determine the absolute position of the machine member. Consequently, during an initialization procedure, the output signals of the master resolver and vernier resolver may be conveniently sampled and thereafter the signals of only the master resolver, for example, continuously monitored. The selector 14 provides the necessary switching to selectively connect the output signals of the master resolver and vernier resolver to the interface circuit 12.

FIG. 3 shows the circuitry of selector 14 associated with the master resolver 60 and vernier resolver 62 of the absolute position measuring subsystem 16. A relay coil 80 is energized by a select control signal 81 produced by the control 10 as part of an initialization procedure. Upon energization of the coil 80 the armatures of contact pairs 82, 84, 86, and 88 (shown in the normally closed positions) switch from the normally closed connections to the normally open connections. With the normally closed connections made, output signals of the master resolver are connected to the interface circuit 12 through conductors of cable 20. With the normally open connections made, output signals of the vernier resolver are connected to interface circuit 12 through the same conductors of cable 20. Similar relays are provided for each of the six axes of the machine and all of the relays may be energized simultaneously by the appropriate control signals from the control 10. Each set of relay contacts effects switching of signal pairs between the master resolver and vernier resolver, conducting the output signals to the single conductor pair of the cable between the control and selector.

It will be appreciated by those skilled in the art that to enhance the signal to noise ratio of the signals being transmitted between the interface circuit and the absolute position measuring subsystems, it is necessary to use appropriate transmission line techniques in the design of the cables. It is common practice to use twisted pairs with grounded shields to conduct signals between an interface circuit and a resolver. Each resolver requires three conductor pairs, and in the arrangement shown with reference to FIG. 2, two conductor pairs are required for the output signals. While the input signals for all resolvers may be transmitted by a single conductor pair from the interface circuit to a common connection for all the resolver rotors, the output signals of all resolvers must be connected by individual conductor pairs to an interface circuit. Where two resolvers are used with each axis of motion of the machine, a minimum of 25 conductor pairs would be required between the interface circuit and the measurement subsystems. However, by use of the selector 14, placed proximate to the absolute position measuring subsystems on the machine, the number of conductor pairs required between the interface circuit 12 and the machine is reduced to a minimum of 13 pairs. Provided an appropriate ground is available at the selector 14, the control signal for the relay 80 may be carried by a single conductor.

Figure 4:
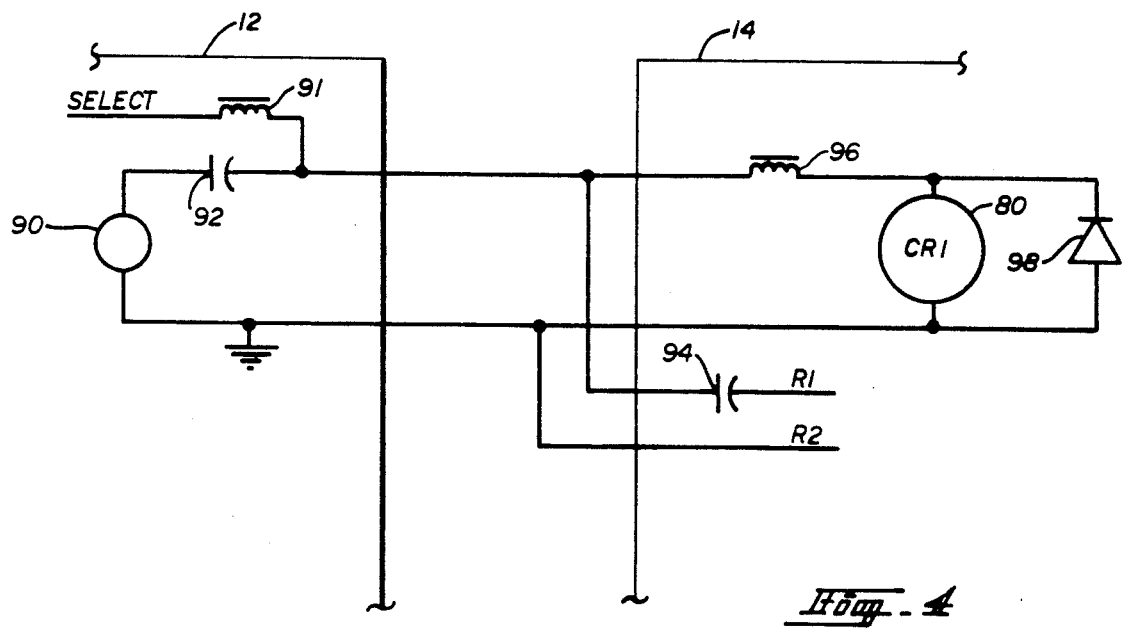
FIG. 4 is an alternative circuit for transmitting a control signal to the selector circuit of FIG. 3.

As an alternative to use of a separate conductor of the selector control signal, the circuit of FIG. 4 illustrates the application of a control signal to the common resolver input signal conductor pair. At the interface 12, a resolver input signal is produced by generator 90, one side of which is grounded. The resolver input signal is an AC signal. The select signal for the relay 80 is a DC signal and a capacitor 92 inserted in the conductor between the generator 90 and the point of application of the select signal blocks the DC signal from the output circuitry of generator 90. Correspondingly, an inductor 91 isolates the select signal generator circuitry from the AC resolver input signal. At the selector 14, capacitor 94 is inserted in the signal line from which the common resolver input signal is derived to block the DC signal from application to the resolvers. An inductor 96 is inserted in the signal line to the relay coil to filter the AC signal from the resolver signal generator 90, producing a DC control signal at the relay coil 80. A diode 98 is shown in parallel across the relay coil 80 to provide for suppression of inductive transients which arise upon deenergization of the relay coil 80.

While the arrangement of FIG. 1 places the selector 14 proximate the absolute position measuring subsystems and effects selective connection of output signals for all of the angular position measuring devices, it will be appreciated that the switching components may alternatively be located individually with the absolute position measuring subsystems, thereby eliminating cabling to a separate selector. In an arrangement where the angular position measuring devices for each axis are incorporated into a position measuring unit, the output signal selecting relay may conveniently be located in the same unit. With such an arrangement, the circuitry of FIG. 4 is advantageously used to eliminate the need for signal wiring dedicated to operation of the relays, further reducing the complexity of the cabling between the machine and the control. Other combinations and alterations will be apparent to those skilled in the art.

While the preferred embodiment has been described in considerable detail, it is not intended to in any way limit the applicability of the invention by the details of the preferred embodiment. Rather, it is the intention of applicants that the invention cover all modifications, alterations, and equivalents falling within the spirit and scope of the appended claims. It is specifically noted that the selective connection of position measuring device output signals may be applied advantageously to measuring devices other than resolves, including, for example encoders, or linear devices using magnetic or optical scales or any other device producing output signals representing relative position of a device armature and device stator.

What is claimed is:

1. Apparatus for absolute position measurement of a movable machine member comprising:
   a. a first angular position measuring device having a first rotor and a first stator for producing first output signals representing the relative angular position of the first rotor relative to the first stator;
   b. a second angular position measuring device having a second rotor and a second stator for producing second output signals representing the relative angular position of the second rotor relative to the second stator;
   c. a coupling means providing mechanical coupling between the machine member and the first and second angular position measuring devices such that the difference between the angular position represented by the first output signals and the angular position represented by the second output signals is unique at any position of the machine member throughout its range of motion;
   d. an interface circuit for receiving output signals of a single angular position measuring device;
   e. means for producing a control signal; and,
   f. means responsive to the control signal for selectively connecting the first and second output signals to the interface circuit.

2. The apparatus of claim 1 wherein the selectively connecting means is operated to provide connection of the first output signals to the interface circuit at all times other than during an initialization procedure.

3. The apparatus of claim 2 wherein the first and second angular position measuring devices are resolvers.

4. The apparatus of claim 3 wherein the first output signals are connected to the selectively connecting means by a first pair of conductors and the second output signals are connected to the selectively connecting means by a second pair of conductors and the interface circuit is connected to the selectively connecting means by a third pair of conductors.

5. The apparatus of claim 4 wherein the selectively connecting means comprises a relay including switch means for selectively connecting the first and second pairs of conductors to the third pair of conductors.

6. A method of measuring absolute position of a movable machine member wherein a plurality of angular position measuring devices are mechanically coupled to the machine member, each measuring device producing output signals representing the angular position of a device rotor relative to a device stator, the mechanical coupling being such that a difference between the positions represented by the output signals of at least two angular position measuring devices has a unique value at every position of the machine member within a range of motion effected by a single drive, and an interface circuit being provided to receive the output signals, the method comprising the steps of:
   a. producing a control signal; and
   b. selectively connecting each of the output signals to the interface circuit in response to the control signal.

7. The method of claim 6 wherein the plurality of angular position measuring devices consists of two resolvers coupled to the machine member and the step of selectively connecting the output signals to the interface circuit further comprises:
   a. connecting the input signals of a first resolver to the interface circuit at all times other than during connection of the output signals of the other resolver to the interface circuit; and,
   b. momentarily connecting the output signals of the other resolver to the interface circuit in response to the control signal.

8. The method of claim 7 wherein the output signals of each resolver are produced as a function of a angular position of a resolver rotor relative to a resolver stator in response to input signals produced by the interface circuit.

9. The method of claim 8 wherein the output signals of the resolvers are connected to a selecting means by first and second conductor pairs, the interface circuit is connected to the selecting means by a third conductor pair, the input signals are connected from the interface circuit to the resolvers by a fourth conductor pair, and the control signal is connected to the selecting means by the fourth conductor pair and the step of momentarily connecting the output signals of the other resolver to the interface circuit comprises momentarily disconnecting the first conductor pair from the third conductor pair and momentarily connecting the second conductor pair to the third conductor pair.

* * * * *